United States Patent
Hsieh

(10) Patent No.: US 6,513,542 B1
(45) Date of Patent: Feb. 4, 2003

(54) LIQUID SUPPLY OR DRAIN PIPE EQUIPPED WITH A LEAKAGE DETECTOR

(75) Inventor: Tsung-Chi Hsieh, Tanishui (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 09/634,495

(22) Filed: Aug. 8, 2000

(51) Int. Cl.[7] ............... G01M 3/04; G01M 3/18; F17D 3/00; F16K 37/00
(52) U.S. Cl. ............... 137/312; 137/554; 137/557; 137/486; 137/487.5; 73/40.5 R; 340/605; 340/606; 340/608
(58) Field of Search ............... 137/312, 387, 137/392, 554, 557, 558, 613, 485, 486, 487.5; 340/604, 605, 606, 620, 608; 73/40.5 R, 46, 49.8

(56) References Cited

U.S. PATENT DOCUMENTS

| | | | | |
|---|---|---|---|---|
| 3,473,554 A | * | 10/1969 | King ............... | 137/312 |
| 4,067,352 A | * | 1/1978 | Halpine ............... | 137/312 |
| 4,324,268 A | * | 4/1982 | Jacobson ............... | 137/312 |
| 4,749,002 A | * | 6/1988 | Lembser ............... | 137/312 |
| 4,821,769 A | * | 4/1989 | Mills et al. ............... | 137/554 |
| 4,846,212 A | * | 7/1989 | Scobie et al. ............... | 137/312 |
| 5,057,822 A | * | 10/1991 | Hoffman ............... | 340/611 |
| 5,156,190 A | * | 10/1992 | Staley, Jr. ............... | 137/312 |
| 5,406,979 A | * | 4/1995 | McHugh ............... | 137/557 |
| 5,511,573 A | * | 4/1996 | Corte ............... | 137/312 |
| 5,588,462 A | * | 12/1996 | McHugh ............... | 137/557 |
| 5,827,950 A | * | 10/1998 | Woodbury et al. ............... | 73/40.5 R |
| 5,885,134 A | * | 3/1999 | Shibata et al. ............... | 137/312 |
| 5,992,218 A | * | 11/1999 | Tryba et al. ............... | 73/40.5 R |
| 6,026,843 A | * | 2/2000 | Pozniak et al. ............... | 137/312 |
| 6,074,276 A | * | 6/2000 | Shibata et al. ............... | 451/8 |
| 6,167,749 B1 | * | 1/2001 | Yanagisawa et al. ............... | 73/40.5 R |

* cited by examiner

Primary Examiner—George L. Walton
(74) Attorney, Agent, or Firm—Tung & Associates

(57) ABSTRACT

A liquid supply/drain conduit system that is equipped with an inner leakage detector and a liquid process tank that is equipped with such liquid supply/drain conduit system are disclosed. The liquid supply/drain conduit system includes a first conduit for feeding a liquid into an inlet of a first valve of the normal-closed type, a second conduit of T-shape that has a horizontal portion and a vertical portion, the horizontal portion of the second conduit flows a liquid from an outlet of the first valve into a reservoir tank. The second valve of the normal-open type has an inlet and an outlet, the inlet is situated in relation to the first valve in such a way that it receives through a vertical portion of the second conduit a leaked flow of liquid by gravity when the normal-closed first valve failed to close. A liquid detector is further provided for detecting a leaked flow of liquid through the second valve. The leakage detector may optionally include an alarm system to be activated when a leakage flow is detected. The leakage detector may further send a signal to a process controller for alerting a machine operator of the leakage status of the liquid supply/drain conduit system.

16 Claims, 3 Drawing Sheets

LIQUID SUPPLY OR DRAIN PIPE EQUIPPED WITH A LEAKAGE DETECTOR

FIELD OF THE INVENTION

The present invention generally relates to a liquid supply or drain pipe for a chemical process tank and more particularly, relates to a liquid supply or drain pipe for a chemical process tank that is equipped with a detector for inner leakage of liquid.

BACKGROUND OF THE INVENTION

In the processing of semiconductor devices, a variety of liquid chemicals are used in processes such as cleaning, etching, photolithographic processes etc. These chemical processes are frequently conducted either in a process tank or the liquid chemical is first stored in a reservoir tank and then dispensed. In any event, the liquid chemical must first be transported into a process tank and then drained from the tank. When the chemical process is to be conducted in the process tank, i.e. such as in a wet etch process, the liquid chemical in the tank must also be replaced or replenished after repeated usage, i.e. by draining from the tank through a drain pipe into a waste chemical collection tank.

A conventional liquid chemical process tank equipped with a supply conduit and a drain conduit is shown in FIG. 1. The liquid chemical process system 10 consists of a process tank 12, a supply conduit 14 and a drain conduit 16. The process tank 12 is shown equipped with an optional overflow tank 18 for receiving an overflow of liquid chemical 20 from the process tank 12. The supply conduit 14 consists of a first supply pipe 22, a supply valve 24 and a second supply pipe 26. The supply valve 24 utilized is a normal-closed type which opens only when activated. The drain pipe 16 consists of a drain valve 28, a first drain pipe 30 and a second drain pipe 32. The overflow tank 18 is further equipped with a recycling pipe 34 for recycling overflow liquid chemical 20 through pump 36, the first drain pipe 30 and a filter 38 back into the process tank 12.

The conventional liquid chemical process system 10 has several operational drawbacks. First, when there is an internal leakage in the supply valve 24 when the valve is supposed to be closed (i.e. in a normal-closed position when not activated), liquid chemical continuously flows into the process tank 12 through the second supply pipe 26. The terminology of "inner leakage" is used to denote a situation wherein liquid leaks through an internal passageway, i.e. through the supply valve 24, and therefore cannot be detected by leakage detectors that are frequently mounted outside the process tank 12 for detecting leakage from the tank or from the supply pipes 22,26. The inner leakage through the supply valve 24, therefore, cannot be detected by this type of leakage detectors. As a result, the inner leakage cannot be detected by machine operators when liquid chemical continuously flows into the process tank 12, and thus making the concentration of the process chemical out of control. Since most semiconductor processes require an accurate control of the composition of the process chemicals, any deviation from the specified chemical composition renders the process unreliable and the product made by the process out of control.

A typical processing problem caused by out-of-specification chemical concentrations is shown in FIG. 2 of a chemical wet etch system. The etch rates are plotted against the number of days the etch chemical has been used illustrating a gradual decrease in the etch rates due to a continuous dilution (or decrease in concentration) of the liquid chemical in the process tank.

Similar processing problems can also be caused by the lack of detection of a leakage in the drain conduit 16, shown in FIG. 1. When the drain valve 28, of the normal-closed type, fails to close completely, liquid chemical 20 in the process tank 12 continuously drains away through drain conduit 16 into a waste collection tank (not shown). This causes excessive usage of the liquid chemical. The inner leakage of liquid chemical through the drain valve 28 cannot be detected by conventional leakage detectors that are mounted in the liquid process system 10.

An example of excessive usage of a liquid chemical is when an inner leakage is not detected as shown in FIG. 3. When the inner leakage is finally corrected in August, the usage of liquid chemical returns to a normal volume.

SUMMARY OF THE INVENTION

In accordance with the present invention, a liquid supply or drain conduit system that is equipped with an inner leakage detector is provided. In an alternate embodiment, a liquid process tank that is equipped with a liquid supply/drain system capable of detecting an inner leakage is further provided.

In a preferred embodiment, a liquid supply or drain conduit system equipped with an inner leakage detector is provided which includes a first conduit for feeding a liquid into an inlet of a first valve of the normal-closed type, a second conduit of T-shape having a horizontal portion and a vertical portion, the horizontal portion of the second conduit flows the liquid from an outlet of the first valve into a reservoir tank, a second valve of the normal-open type that has an inlet and an outlet, the inlet is situated in relation to the first valve in such a way that it receives through a vertical portion of the second conduit a leaked flow of liquid by gravity when the normal-closed first valve failed to close, and a leakage detector for detecting a flow of liquid through the second valve.

In the liquid supply or drain pipe equipped with a leakage detector, the reservoir tank may be a chemical process tank, or a waste chemical collection tank. The leakage detector may further include a liquid flow meter, or an alarm to be activated when a liquid flows through the second valve. The leakage detector sends a signal to a micro-processor when a flow of liquid through the second valve is detected. The leakage detector further sends a signal to a close-loop control system for closing the first valve when a flow of liquid through the second valve is detected.

The present invention is further directed to a liquid process tank that is equipped with a supply/drain system capable of detecting inner leakage that includes a process tank for receiving a fresh liquid from a second conduit and for draining a used liquid to a third conduit, a first conduit for feeding the fresh liquid into an inlet of a first valve of the normal-closed type, the second conduit is provided in a T-shape that has a horizontal portion and a vertical portion, the horizontal portion flows the fresh liquid from an outlet of the first valve into the process tank, a second valve of the normal-open type that has an inlet and an outlet, the inlet is situated in relation to the first valve in such a way that it receives through the vertical portion of the second conduit a leaked flow of the fresh liquid by gravity when the first valve failed to close, a first leakage detector for detecting a flow of the fresh liquid through the second valve, the third conduit for draining the used liquid from the process tank into an inlet of a third valve, a fourth conduit that is provided in a T-shape that has a horizontal portion and a vertical portion, the horizontal portion receives the used liquid from an outlet of the third valve and delivers the used liquid to a used liquid collection tank, a fourth valve of the normal-closed type that has an inlet and an outlet, the inlet is situated in relation to the third valve in such a way that it receives through the vertical portion of the fourth conduit a leaked flow of the used liquid by gravity when the third valve failed to close, and a second leakage detector for detecting a flow of the used liquid through the fourth valve.

The liquid process tank that is equipped with a supply/drain system capable of detecting inner leakage may further include a micro-processor for receiving a signal from the first and the second leakage detector when a leakage is detected by either one of the detectors. The liquid process tank may further include an alarm system to be activated by a signal received from either one of the first or the second leakage detectors. The process tank may be an etch tank, or a photoresist liquid reservoir tank. The process tank may further include an outer overflow tank for receiving overflow from the process tank. The process tank may further include an outer overflow tank and a pump for pumping an overflow from the process tank back into the process tank. The first valve may be a supply valve and the third valve may be a drain valve. The first and the second leakage detectors may further include a liquid flow meter for sensing a flow of liquid therethrough.

It is therefore an object of the present invention to provide a liquid supply or drain conduit system that does not have the drawbacks or shortcomings of the conventional liquid supply or drain systems.

It is another object of the present invention to provide a liquid supply or drain conduit system that is equipped with an inner leakage detector.

It is a further object of the present invention to provide a liquid supply or drain conduit system that is provided with at least one valve module for detecting an inner leakage.

It is another further object of the present invention to provide a liquid supply or drain conduit system wherein a supply valve or a drain valve is further equipped with a normal-open valve and a leakage detector.

It is still another object of the present invention to provide a liquid supply or drain conduit system equipped with an inner leak detector such that an alarm is activated when a leakage is detected.

It is yet another object of the present invention to provide a liquid process tank that is equipped with a supply/drain system capable of detecting an inner leakage of a liquid chemical.

It is still another further object of the present invention to provide a liquid process tank that is equipped with a supply/drain system capable of detecting an inner leakage of fresh chemical from the supply conduit or an inner leakage of used chemical from the drain conduit.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1:
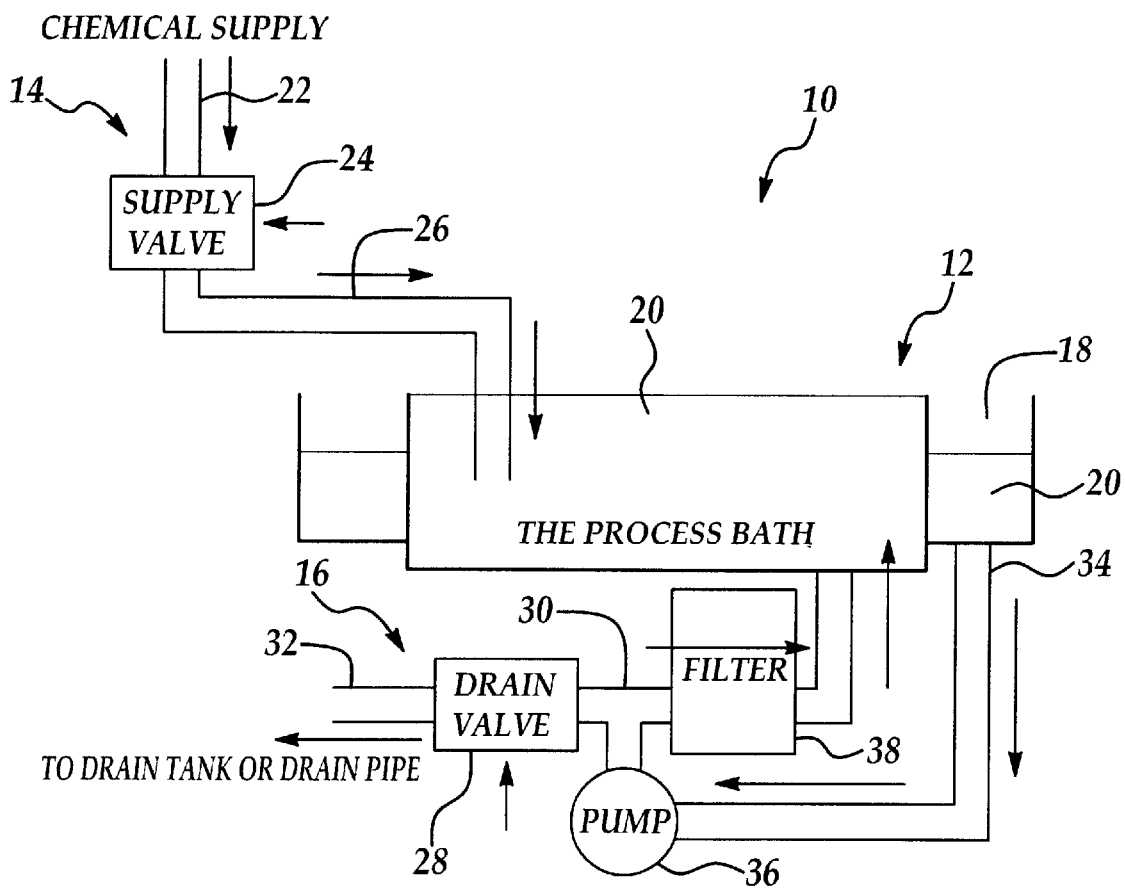
FIG. 1 is a graph illustrating a conventional liquid process tank equipped with a supply valve and a drain valve.
Figure 2:
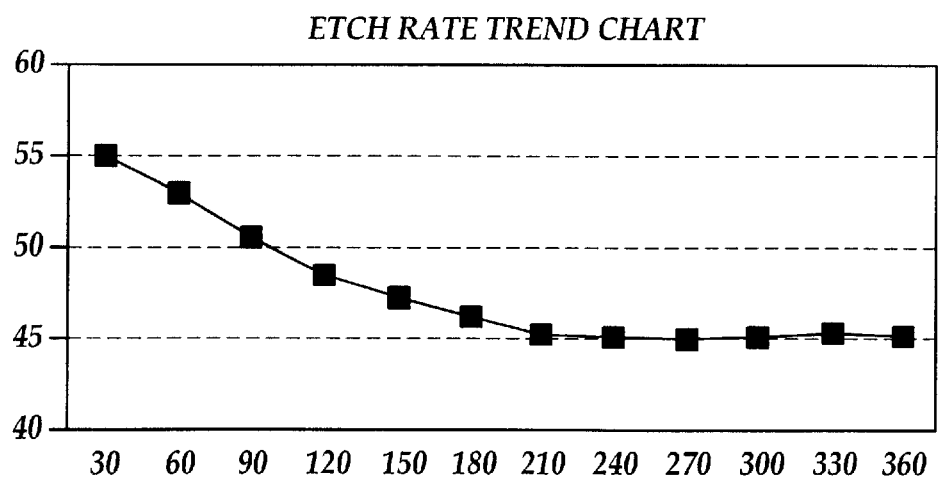
FIG. 2 is a graph illustrating the effect of an inner leak in a liquid supply valve resulting in a continuous leakage into a process tank.
Figure 3:
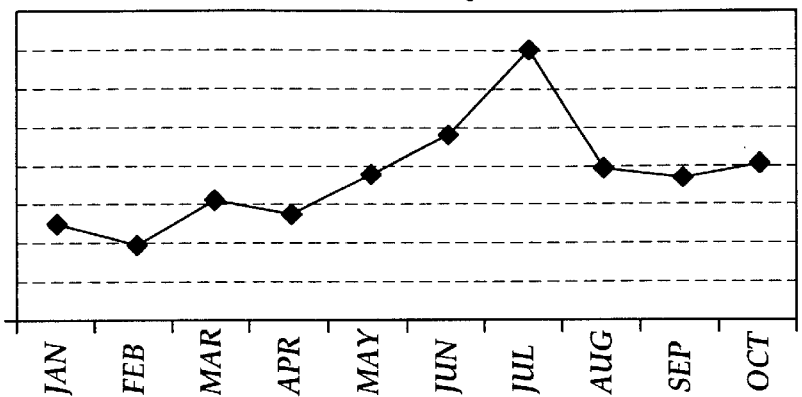
FIG. 3 is a graph illustrating the effect of a continuous leakage through a liquid drain valve on a process tank resulting in excessive usage of a liquid chemical.

The present invention discloses a liquid supply or drain conduit system that is equipped with an inner leakage detector. The present invention further discloses a liquid process tank that is equipped with a supply/drain system capable of detecting an inner leakage.

The liquid supply or drain conduit system that is equipped with a built-in inner leakage detector consists of a first conduit, a second conduit, a first valve of the normal-closed type, a second valve of the normal-open type, and a leakage detector. The first conduit is used for feeding a fresh liquid into an inlet of a first valve of the normal-closed type. The second conduit is generally a T-shaped conduit that has a horizontal portion and a vertical portion. The horizontal portion of the second conduit flows the liquid from an outlet of the first valve into a reservoir tank. The second valve of the normal-open type has an inlet and an 5 outlet. The inlet of the second valve is situated in relation to the first valve in such a way that it receives through a vertical portion of the second conduit a leaked flow of liquid by gravity when the normal-closed first valve failed to close. The leakage detector is used for detecting a flow of liquid through the second valve, and for sending out an alarm or a signal to a micro-processor for shutting-off the liquid supply to the liquid supply conduit.

The liquid process tank that is equipped with a supply/drain system capable of detecting an inner leakage of liquid consists of a process tank, a first conduit, a second conduit, a first valve, a second valve, a first leakage detector, a third conduit, a fourth conduit, a third valve and a fourth valve, and a second leakage detector. The process tank receives a fresh liquid from the second conduit and drains away a used liquid to a third conduit. The first conduit is used for feeding a fresh liquid into an inlet of a first valve of the normal-closed type. The second conduit is provided in a T-shape that has a horizontal portion and a vertical portion, the horizontal portion flows the fresh liquid from an outlet of the first valve into the process tank. The second valve is of the normal-open type that has an inlet and an outlet, the inlet is situated in relation to the first valve in such a way that it receives through the vertical portion of the second conduit a leakage flow of the fresh liquid by gravity when the first valve failed to close. The first leakage detector is used for detecting a flow of the fresh liquid through the second valve. The third conduit is used for draining away the used liquid from the process tank into an inlet of a third valve. The fourth conduit is provided in a T-shape that has a horizontal portion and a vertical portion. The horizontal portion receives the used liquid from an outlet of the third valve and delivers the used liquid to a used liquid collection tank. The fourth valve of the normal-closed type has an inlet and an outlet, the inlet is situated in relation to the third valve in such a way that it receives through the vertical portion of the fourth conduit a leaked flow of the used liquid by gravity when the third valve failed to close. The second leakage detector is used for detecting a flow of the used liquid through the fourth valve.

Figure 4:
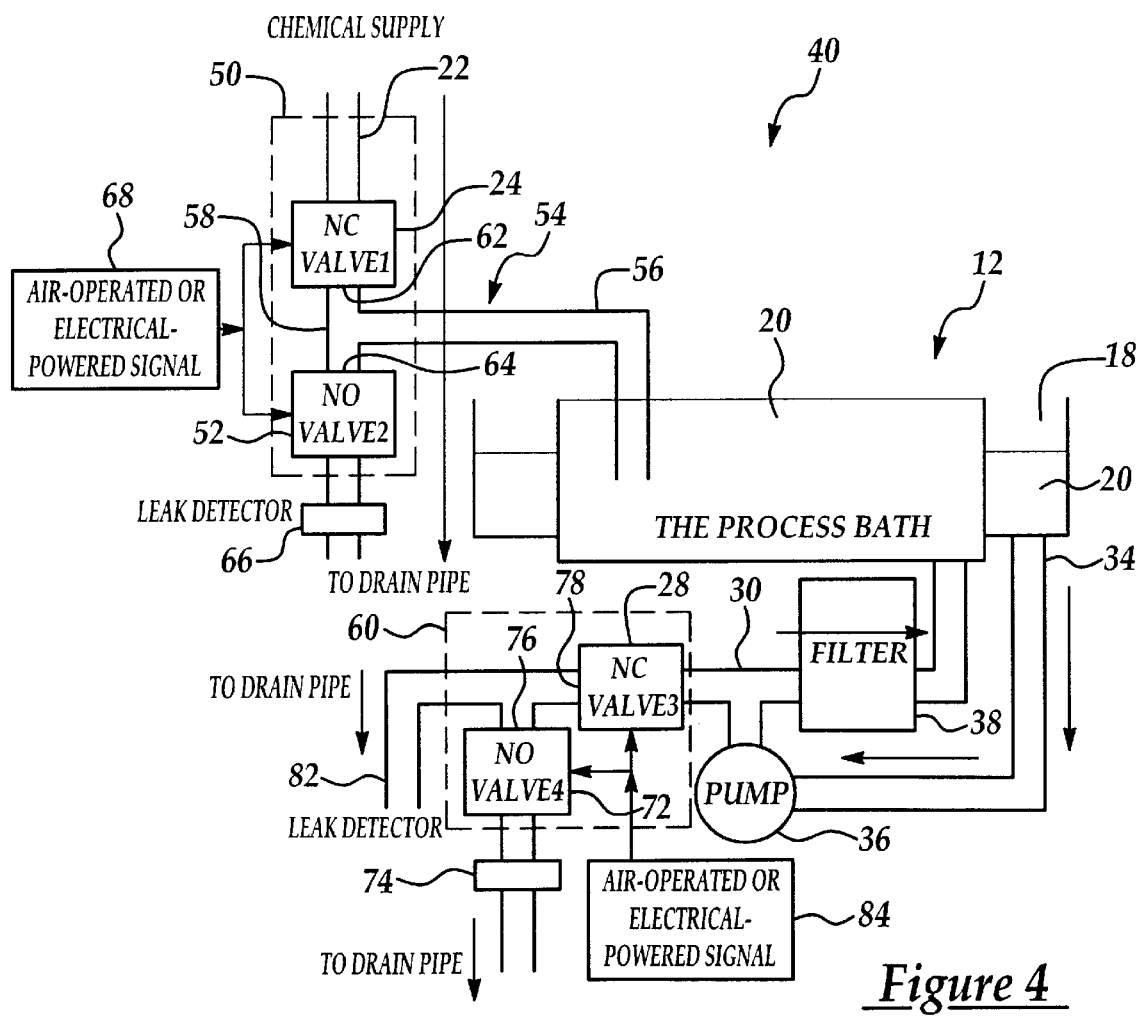
FIG. 4 is a graph illustrating the present invention liquid supply system equipped with inner leakage detectors in both the supply conduit and the drain conduit.

The present invention liquid supply system 40 is shown in FIG. 4. The system 40 includes a chemical supply valve module 50, a process tank 12 for holding a liquid chemical 20, and a chemical drain valve module 60. An enlarged view of the chemical supply valve module 50 is further shown in FIG. 5, while an enlarged view of the chemical drain valve module 60 is further shown in FIG. 6.

The present invention chemical supply valve module 50 utilizes both a normal-closed valve 24 and a normal-open valve 52 in a valve module to perform the function of open/close control of the second conduit 54 without the inner leakage problem. The second conduit 54 is constructed in a T-shape with horizontal portion 56 and a vertical portion 58. The vertical portion 58 connects an outlet 62 of the first valve 24 with an inlet 64 of the second valve 52. The second valve 52, of the normal-open type, is further connected to a first leakage detector 66 for detecting any flow of fresh liquid chemical through the second valve 52. The leakage detector 66 may further include a flow meter for sensing or measuring a liquid flow therethrough.

As shown in FIG. 4, in the chemical supply valve module 50, the second valve 52 of the normal-open type should be positioned in such a way that its inlet 64 receives from the vertical portion 58 of the second conduit 54 any leaked flow of fresh liquid by gravity when the first valve, i.e. the normal-closed valve 24 failed to close. The positioning of the second valve 52 at a lower elevation than the first valve 24 is important such that liquid flows by gravity into the second valve 52. The leakage detector 66 may further be provided with an alarm system (not shown) that is activated when leaked liquid flows through the leakage detector 66. The leakage detector 66 may further send out a signal to a process controller for sounding an alarm or for notifying a machine operator the condition of a leakage. The process controller 68 may send out an air-operated or electrical-powered signal to either the first valve 24 or the second valve 52 when a leakage is detected. The present invention chemical supply valve module 50 therefore enables a complete control of the flow of a fresh liquid through valve 24 into the process tank 12 without any danger of inner leakage that cannot be detected. Any further leakage into the process tank 12 would be detected by the leakage detector 66 when the fresh liquid flows through the second valve 52.

The present invention liquid supply system 40 is further equipped with a chemical drain valve module 60 which consists of a third conduit 30, a third valve 28, a fourth valve 72 and a second leakage detector 74. The fourth valve 72 is provided in a normal-open type, which is in contrast to the third valve 28 of a normal-closed type. The positioning of the fourth valve 72 should be such that an inlet 76 of the fourth valve 72 must be in a lower elevation than the outlet 78 of the third valve 28. This allows any leaked used liquid from process tank 12 into the normal-open valve 72 and the second leakage detector 74 for detection before the used liquid is drained into the fourth conduit 82, or into a waste liquid collection tank (not shown). The second leakage detector 74 may further include an alarm system (not shown) or a process controller 84 for receiving signals from the third valve 28 and the fourth valve 72.

Figure 5:
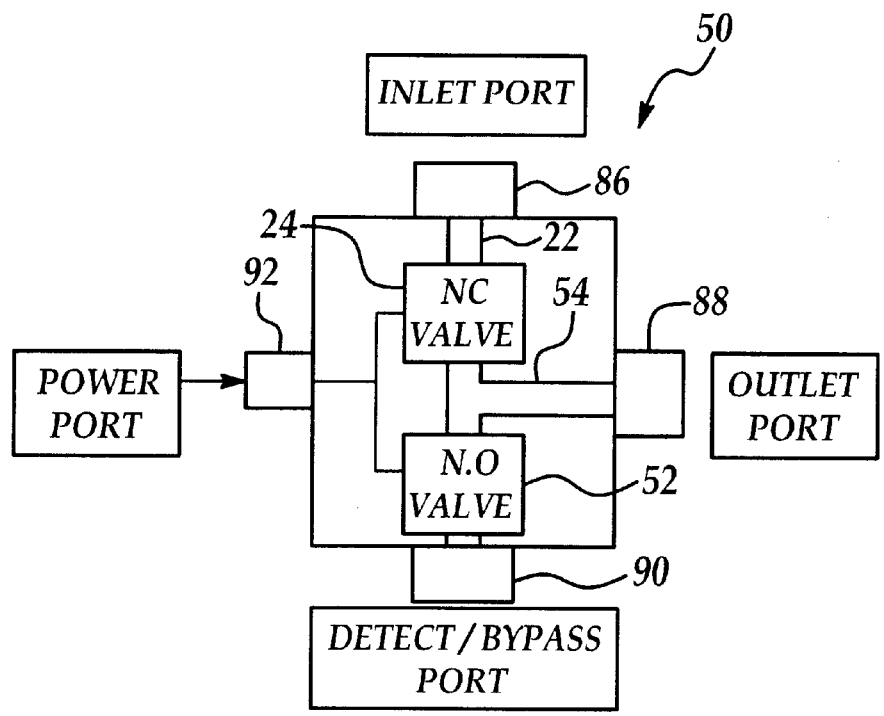
FIG. 5 is an enlarged view of the liquid supply valve module for detecting inner leakage.

An enlarged view of the chemical supply valve module 50 is shown in FIG. 5 illustrating an inlet port 86 connected to the first conduit 22, an outlet port 88 connected to the second conduit 54, a detector port 90 connected to the second valve 52 with the leakage detector (not shown) therein between. A power port 92 is further provided for providing electrical connection to the first valve 24 and the second valve 52.

Figure 6:
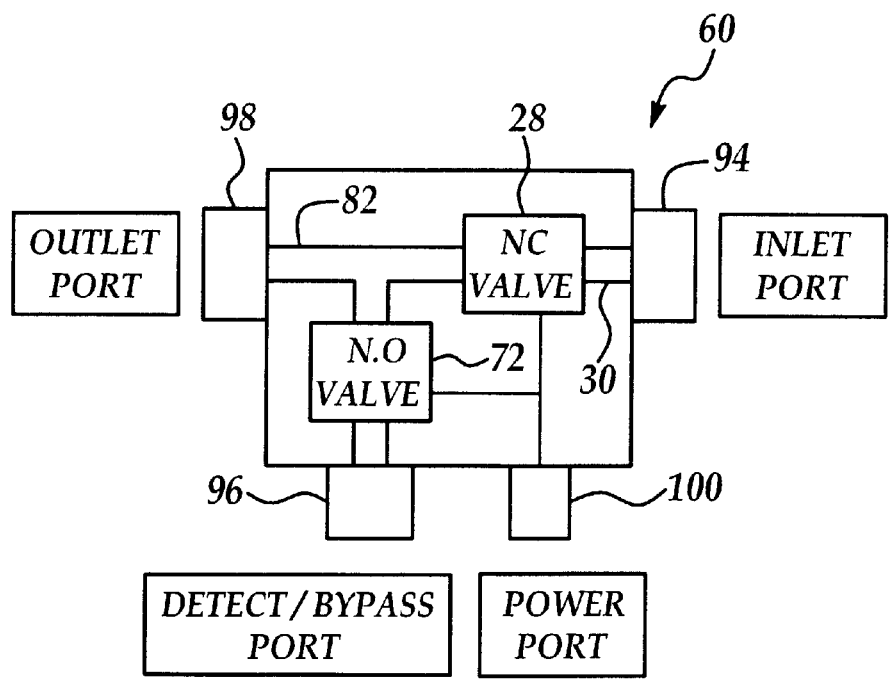
FIG. 6 is an enlarged view of the liquid drain valve module for detecting inner leakage through the drain valve.

FIG. 6 is an enlarged illustration of the present invention liquid drain valve module 60 consisting of an inlet port 94 connected to the third conduit 30, a detector port 96 connected to the fourth valve 72 with the second leakage detector (not shown) therein between, an outlet port 98 connected to the fourth conduit 82 for draining to a waste collection tank (not shown), and a power port 100 for receiving signals from the third valve 28 and the fourth valve 72.

The present invention novel liquid supply/drain conduit system and a liquid process tank equipped with such a system have therefore been amply described in the above description and in the appended drawings of FIGS. 4, 5 and 6.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A liquid supply or drain conduit system equipped with a leakage detector comprising:

a first valve of the normal closed type having an inlet and an outlet, a first conduit for feeding a liquid into said inlet of said first valve, a second conduit of T-shape having a horizontal portion and a vertical portion, said horizontal portion of the second conduit being in fluid communication with said outlet of said first valve for flowing said liquid into a reservoir tank when said first valve is in an opened state, a second valve of the normal-open type except when said first valve is in an opened state having an inlet and an outlet, said inlet of said second valve being in fluid communication with said outlet of said first valve and situated under said first valve in such a way that said inlet of said second valve receives through said vertical portion of said second conduit a leaked flow of liquid by gravity when said first valve is supposed to be in a closed state but failed to close, and a leakage detector positioned under and in fluid communication with said outlet of the second valve for detecting a flow of liquid through said second valve, when said first valve is in a closed state and said second valve is in an opened state.

2. A liquid supply or drain conduit system equipped with a leakage detector according to claim 1, wherein said reservoir tank is a chemical process tank.

3. A liquid supply or drain conduit system equipped with a leakage detector according to claim 1, wherein said reservoir tank is a waste chemical collection tank.

4. A liquid supply or drain conduit system equipped with a leakage detector according to claim 1, wherein said leakage detector further comprises a liquid flow meter.

5. A liquid supply or drain conduit system equipped with a leakage detector according to claim 1, wherein said leakage detector further comprises an alarm to be activated when a liquid flows through said second valve.

6. A liquid supply or drain conduit system equipped with a leakage detector according to claim 1, wherein said leakage detector sends a signal to a micro-processor when a flow of liquid through said second valve is detected.

7. A liquid supply or drain conduit system equipped with a leakage detector according to claim 1, wherein said leakage detector sends a signal to a closed-loop control system for closing said first valve when a flow of liquid through said second valve is detected.

8. A liquid process tank equipped with a supply/drain system capable of detecting an inner leakage comprising:

a process tank for receiving a fresh liquid from a second conduit and for draining a used liquid to a third conduit, a first valve of the normal-closed type having an inlet and an outlet, a first conduit for feeding said fresh liquid into said inlet of said first valve, a second conduit being provided in a T-shape having a horizontal portion and a vertical portion, said horizontal portion being in fluid communication with said outlet of said first valve for flowing said fresh liquid from said outlet of said first valve into said process tank, when said first valve is in an open state, a second valve of the normal-open type except when said first valve is in an open state having an in;et and an outlet, said inlet of said second valve being in fluid communication with said outlet of said first valve and is situated under said first valve in such a way that it receives through said fresh liquid by gravity when said first valve is supposed to be in close state but failed to close, a first leakage detector positioned under and in fluid communication with said outlet of said second valve, when said first valve is in a closed state and said second valve is in an open state, a third conduit for draining said used liquid from said process tank into an inlet of a third valve, a fourth conduit of T-shape having a horizontal portion and a vertical portion, said horizontal portion being in fluid communication with and receives said used liquid from said outlet of said third valve and delivers said used liquid to a used liquid collection tank, a fourth valve of the normal-open type, except when said third valve is in an open state, having an inlet and an outlet, said inlet in fluid communication with said outlet of the third valve and is situated under said third valve in such a way that it receives through said vertical portion of said fourth conduit a leaked flow of said used liquid by gravity when said third valve is supposed to be in a closed state but failed to close, and a second leakage detector positioned under and in fluid communication with said outlet of said fourth valve for detecting a flow of said used liquid through said fourth valve, when said third valve is in a closed state and said fourth valve is in an opened state.

9. A liquid process tank equipped with a supply/drain system capable of detecting inner leakage according to claim 8 further comprising a micro-processor for receiving a signal from said first and said second leakage detector when a leakage is detected by either of said detectors.

10. A liquid process tank equipped with a supply/drain system capable of detecting inner leakage according to claim 8 further comprising an alarm system to be activated by a signal received from either of said first or said second leakage detector.

11. A liquid process tank equipped with a supply/drain system capable of detecting inner leakage according to claim 8, wherein said process tank is an etch tank.

12. A liquid process tank equipped with a supply/drain system capable of detecting inner leakage according to claim 8, wherein said process tank is a photoresist liquid reservoir tank.

13. A liquid process tank equipped with a supply/drain system capable of detecting inner leakage according to claim 8, wherein said process tank further comprises an outer overflow tank for receiving overflow from said process tank.

14. A liquid process tank equipped with a supply/drain system capable of detecting inner leakage according to claim 8, wherein said process tank further comprises an outer overflow tank and a pump for pumping an overflow from said process tank back into said process tank.

15. A liquid process tank equipped with a supply/drain system capable of detecting inner leakage according to claim 8, wherein said first valve is a supply valve and said third valve is a drain valve.

16. A liquid process tank equipped with a supply/drain system capable of detecting inner leakage according to claim 8, wherein said first and said second leakage detector further comprises a liquid flow meter for sensing a flow of liquid therethrough.

* * * * *